F. R. FERGUSON.
TRANSMISSION LOCK.
APPLICATION FILED JAN. 2, 1917.
1,239,374.
Patented Sept. 4, 1917.
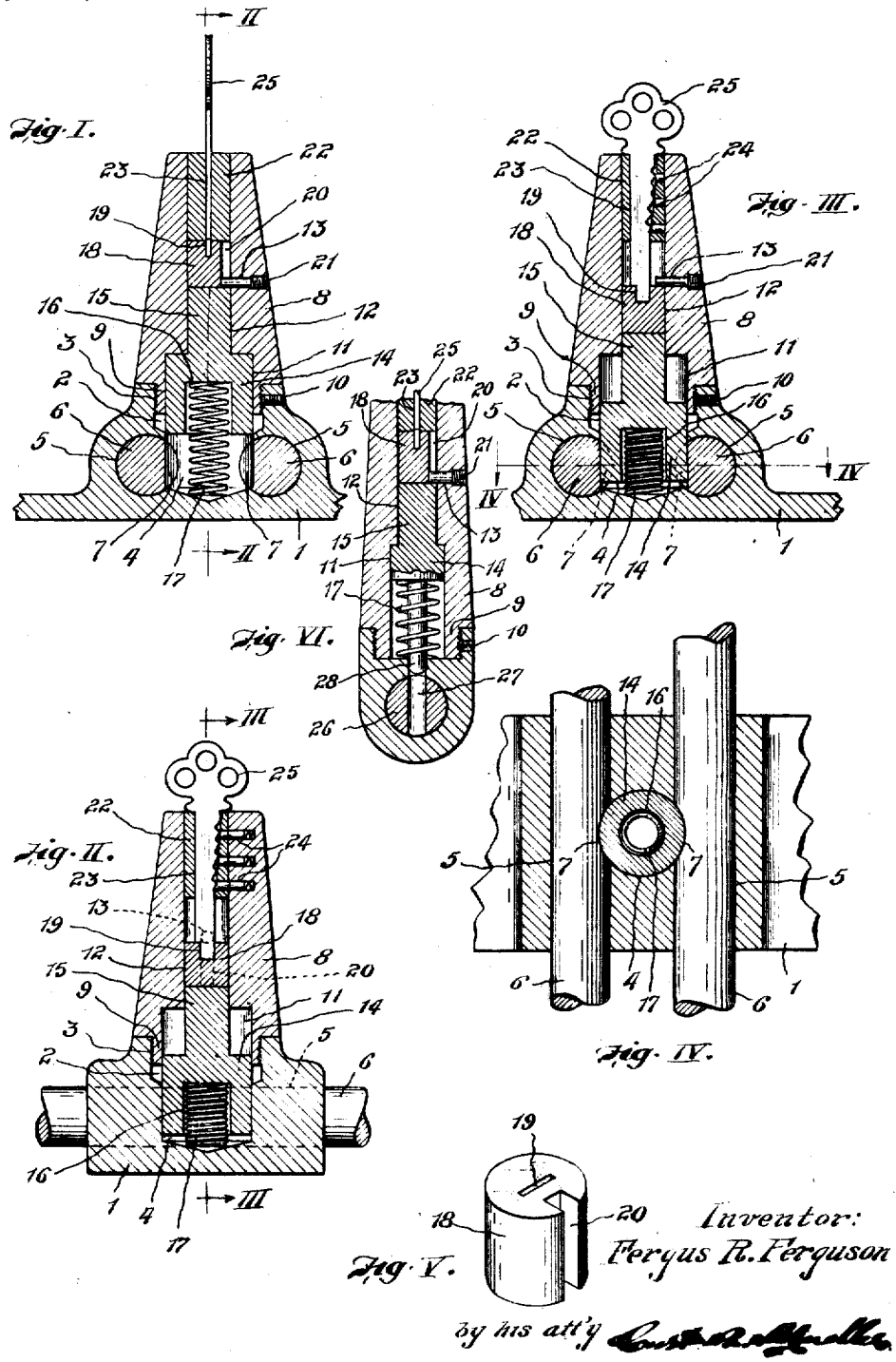
Inventor:
Fergus R. Ferguson
by his att'y

UNITED STATES PATENT OFFICE.

FERGUS R. FERGUSON, OF CLEVELAND, OHIO.

TRANSMISSION-LOCK.

1,239,374.   Specification of Letters Patent.   Patented Sept. 4, 1917.

Application filed January 2, 1917. Serial No. 140,083.

*To all whom it may concern:*

Be it known that I, FERGUS R. FERGUSON, a citizen of the United States, residing at 2365 East 69th street, Cleveland, in the county of Cuyahoga and State of Ohio, have invented a new and useful Improvement in Transmission-Locks, of which the following is a specification, the principle of the invention being herein explained and the best mode in which I have contemplated applying that principle, so as to distinguish it from other inventions.

My present invention relates to a motor-transmission lock to be employed in a novel manner if not in a novel place as well. More particularly the idea is to lock that member in an automobile structure which directly actuates the shift gear parallel to the axes of the several other gears by means of which the varying ratios of speed may be had.

I am familiar with the many different ways that have been proposed for locking automobiles against unauthorized driving, including various resorts for securing one of the control levers. Each of these has been either too cumbersome, too accessible to violence, too expensive, too unsightly or else too readily circumvented.

Accordingly, my object has been to contrive a lock which would be of great strength, inconspicuous, indeed almost completely hidden, exceedingly difficult forcibly to disturb, and yet be conveniently and easily manipulated.

I would have it expressly understood that I in no wise limit myself to this specific application or embodiment of my invention, which I have selected as a basis for illustrating and describing my invention merely for the purpose of rendering a clear and comprehensive understanding of the scope and novel features thereof.

Adverting to the drawing:

Figure I is a vertical section of a lock embodying my invention.

Fig. II is a section on line II—II of Fig. I looking in the direction of the indicating arrows and showing some of the movable parts in an altered position.

Fig. III is a section on line III—III of Fig. II with certain additional parts likewise altered as to position.

Fig. IV is a section on line IV—IV of Fig. III.

Fig. V is a perspective view of only detail.

Fig. VI is a vertical section partially cut away of a modified form of my invention.

The structure chosen for exemplification in the drawing involves a locking of the two parallel shifter rods in common use to-day in gear transmission.

A suitable fixture 1 is provided with a bore 2 opening therethrough in a given direction and provided with screw threads 3. It is extended or deepened by a concentric bore 4 of lesser diameter. Merging with the opposite sides of the bore 4 are a pair of traverse bearings 5 in which a pair of shifter rods 6 may be reciprocated. Each of the rods 6 is fashioned with a groove 7 corresponding in shape and dimension with the measure of intersection of each of the bearings 6 with the bore 4 as may be seen in Figs. I and IV.

A lock housing 8 having a reduced screw-threaded extremity 9 is seated in the opening 3 and may be further secured in place by means of the locking screw 10. The housing 8 is hollow from end to end and its bore is largest at its inner end 11 where it in fact corresponds to the bore 4, so as to constitute an accurate continuance thereof. The remainder 12 of the housing bore is of uniform size and smaller. Intersecting the bore 12 intermediately of its ends is an opening 13, the object of which will later appear. A plunger having one extremity 14 fitted to occupying the bore 11 and its other extremity 15 fitted to and occupying a portion of the bore 12 is itself provided with concentric bore 16 extending a suitable distance into its end 14. A compression spring 17 is inserted into the bore 16 and its opposite end bears against the bottom of the bore 4. As so constructed and arranged the plunger may be depressed against the action of the spring 17, and when the rods 6 are in a predetermined position may occupy the oppositely disposed groove 7 therein. In practice the grooves 7 are concentric with reference to each other and in line with portions of the opposite sides of the plunger when the rods 6 are in the position of rest established by placing gear shift lever (not shown) in neutral position.

A cylindrical block 18 is fitted to and movable within the bore 12 above the upper end 15 of the plunger. It is provided both with a slot 19, and in one side from end to end with a channel 20 adapted to be intersected by a retaining pin 21 inserted through the opening 13. It will be apparent that such an arrangement precludes any rotation of the block 18 when in its normal position as illustrated in Fig. I. The upper portion of the bore 12 is closed by a key-lock being fitted therein. No description of such lock is required, other than to mention that it has a central key-way 23 and a series of laterally extending tumblers 24—each designed to be engaged by some particular serration in a configuration of the key 25. As is seen in the majority of the figures the extremity of the key 25 is adapted to be inserted in slot 19.

Assuming the shifter rods 6 to be in neutral position, when the proper key has been fully inserted the block 18 and also the plunger may be depressed against the action of the spring 17 as appears in Fig. II. It is obvious that any actuation of the rods 6 is then obstructed by reason of the fact that the plunger then occupies the groove 7. Thereafter the key lock may be rotated through an angle of 90 degrees because the block 18 has been carried to a position such that its upper surface is below the retaining pin 21. Consequently after the block 18 has been so given a partial turn its upper surface will be brought into engagement with the retaining pin 21 by the action of the spring 17 and held in such position whereupon the key 25 may be withdrawn and the locking accomplished. When it is desired to release the rod 6, the key is again inserted and the block 18 turned until its channel 20 is in line with the pin 21, after which the spring 17 is permitted to force the parts upwardly until the upper surface of the block 18 impinges against the bottom of the key lock 22.

I claim:

1. A motor transmission lock for motor vehicles having a longitudinally extending actuating member below the floor of the vehicle, comprising a substantially upright plunger for engaging said member so as to prevent its operative movement, a spring acting to move said plunger away from its engaging position, a slotted block movable together with and relative to said plunger and a key lock intersecting and accessible above the floor of the vehicle to co-act with said block for holding such plunger in its engaging position.

2. An automobile motor transmission lock comprising in combination with a pair of transmission gear shifting rods, of a supporting member, a lock carried thereby and accessible to the driver of the automobile, a key insertible through said lock, a block adapted to be engaged and moved in two directions by said key, said block being formed with a lateral channel opening through the top and bottom thereof, a pin secured to said supporting member and adapted to project into said channel, a plunger adapted to be engaged and moved by said block and to so engage said rods as to preclude the operative movement thereof, and means for returning said plunger to its disengaging position when the parts are unlocked.

3. An automobile transmission lock comprising in combination with a pair of transmission gear shifting rods having opposed grooves, of a supporting member fashioned with a bore enlarged at its lower end, a lock carried thereby and accessible to the driver of the automobile, a key insertible through said lock, a block rotatably mounted in the smaller part of said bore and provided above with a slot for the reception of said key, the latter adapted both to rotate and axially move said block, said block being furthermore formed with a lateral channel opening through the top and bottom thereof, a pin secured to said supporting member and adapted to project into said channel, a plunger fitted within the enlarged part of said bore and adapted to be engaged and moved into said grooves by said block, a spring acting against the bottom of said plunger to resist such groove occupying position, the arrangement being such that said pin alternately abuts the tops of said block and plunger, whereby said pin either holds said plunger within said grooves or limits its upward release respectively.

Signed by me, this 28th day of December, 1916.

FERGUS R. FERGUSON.